United States Patent
Arends et al.

(10) Patent No.: US 7,917,501 B2
(45) Date of Patent: Mar. 29, 2011

(54) OPTIMIZATION OF ABSTRACT RULE PROCESSING

(75) Inventors: Mitchell Jon Arends, Rochester, MN (US); Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/938,378

(22) Filed: Nov. 12, 2007

(65) Prior Publication Data

US 2009/0125500 A1     May 14, 2009

(51) Int. Cl.
G06F 7/04 (2006.01)
G06F 7/06 (2006.01)
G06F 7/20 (2006.01)

(52) U.S. Cl. .................. 707/718; 707/752; 707/758

(58) Field of Classification Search ....... 707/3, 999.003, 707/718, 752, 758; 711/1, 100
See application file for complete search history.

(56) References Cited

U.S. PATENT DOCUMENTS

| | | | | |
|---|---|---|---|---|
| 6,049,796 | A * | 4/2000 | Siitonen et al. | 707/3 |
| 6,732,094 | B1 * | 5/2004 | Cousins et al. | 707/5 |
| 6,745,286 | B2 * | 6/2004 | Staub et al. | 711/114 |
| 2003/0167274 | A1 * | 9/2003 | Dettinger et al. | 707/100 |
| 2005/0010571 | A1 * | 1/2005 | Solotorevsky et al. | 707/5 |
| 2007/0112827 | A1 * | 5/2007 | Dettinger et al. | 707/102 |

OTHER PUBLICATIONS

U.S. Patent Application entitled, "Ruleset Optimization Through Blocked and Concurrent Rule Dispatch," filed Nov. 9, 2007, U.S. Appl. No. 11/937,726.

* cited by examiner

*Primary Examiner* — James Trujillo
*Assistant Examiner* — Soheila Davanlou
(74) *Attorney, Agent, or Firm* — Patterson & Sheridan, LLP

(57) ABSTRACT

Embodiments of the invention provide techniques for optimizing the processing of abstract rules. In general, the results of executing an abstract query may be used as data inputs for processing an abstract rule. In one embodiment, query results may be sorted according to input field values required for processing a deterministic abstract rule. If a record of the sorted query results includes the same input values as a preceding record, then the rule output of the preceding record may be reused, rather than processing the abstract rule again. Accordingly, the demand load placed on a rule engine may be reduced.

24 Claims, 5 Drawing Sheets

OPTIMIZATION OF ABSTRACT RULE PROCESSING

BACKGROUND OF THE INVENTION

1. Field of the Invention

The invention generally relates to computer database systems. More particularly, the invention relates to techniques for optimizing the processing of abstract rule sets.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database. Data abstraction models may be used to implement abstract rules. Abstract rules specify predicates and actions, and are composed with reference to logical fields. Abstract rules may be executed in a rule engine in order to perform an analysis routine.

SUMMARY OF THE INVENTION

One embodiment of the invention includes a computer-implemented method of processing an abstract rule. The method may generally include receiving an abstract rule having (i) a conditional statement and (ii) a consequential statement defining a particular result returned by the abstract rule for a given set of input data supplied to the rule. The method may also include receiving a set of query results comprising a plurality of data records each including one or more input values, sorting the plurality of data records according to the one or more input values, and splitting the sorted plurality of data records into two or more data blocks. For each record of a data block, it may be determined whether the input values of a first record match the input values of a previously processed record. If so, the result returned for the processing rule for the previously processed record may be set as an output of processing the first record. Otherwise, the input values of the first record may be processed against the abstract rule to produce a result.

Another embodiment of the invention includes a computer-readable storage medium containing a program which, when executed, performs an operation for processing an abstract rule. The operation may generally include, receiving an abstract rule having (i) a conditional statement and (ii) a consequential statement defining a particular result returned by the abstract rule for a given set of input data supplied to the rule. The operation may further include, receiving a set of query results comprising a plurality of data records each including one or more input values, sorting the plurality of data records according to the one or more input values, and splitting the sorted plurality of data records into two or more data blocks. For each record of a data block, it may be determined whether the input values of a first record match the input values of a previously processed record. If so, the result returned for the processing rule for the previously processed record may be set as an output of processing the first record. Otherwise, the input values of the first record may be processed against the abstract rule to produce a result.

Still another embodiment of the invention includes a system having one or more processing nodes and a memory containing a program, which when executed on the one or more processing nodes, is configured to process an abstract rule. The program may be generally configured to perform the steps of receiving an abstract rule having (i) a conditional statement and (ii) a consequential statement defining a particular result returned by the abstract rule for a given set of input data supplied to the rule. The program may be further configured to perform the steps of receiving a set of query results that include a plurality of data records each including one or more input values, sorting the plurality of data records according to the one or more input values, and splitting the sorted plurality of data records into two or more data blocks. For each record of a data block, it may be determined whether the input values of a first record match the input values of a previously processed record. If so, the result returned for the processing rule for the previously processed record may be set as an output of processing the first record. Otherwise, the input values of the first record may be processed against the abstract rule to produce a result.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
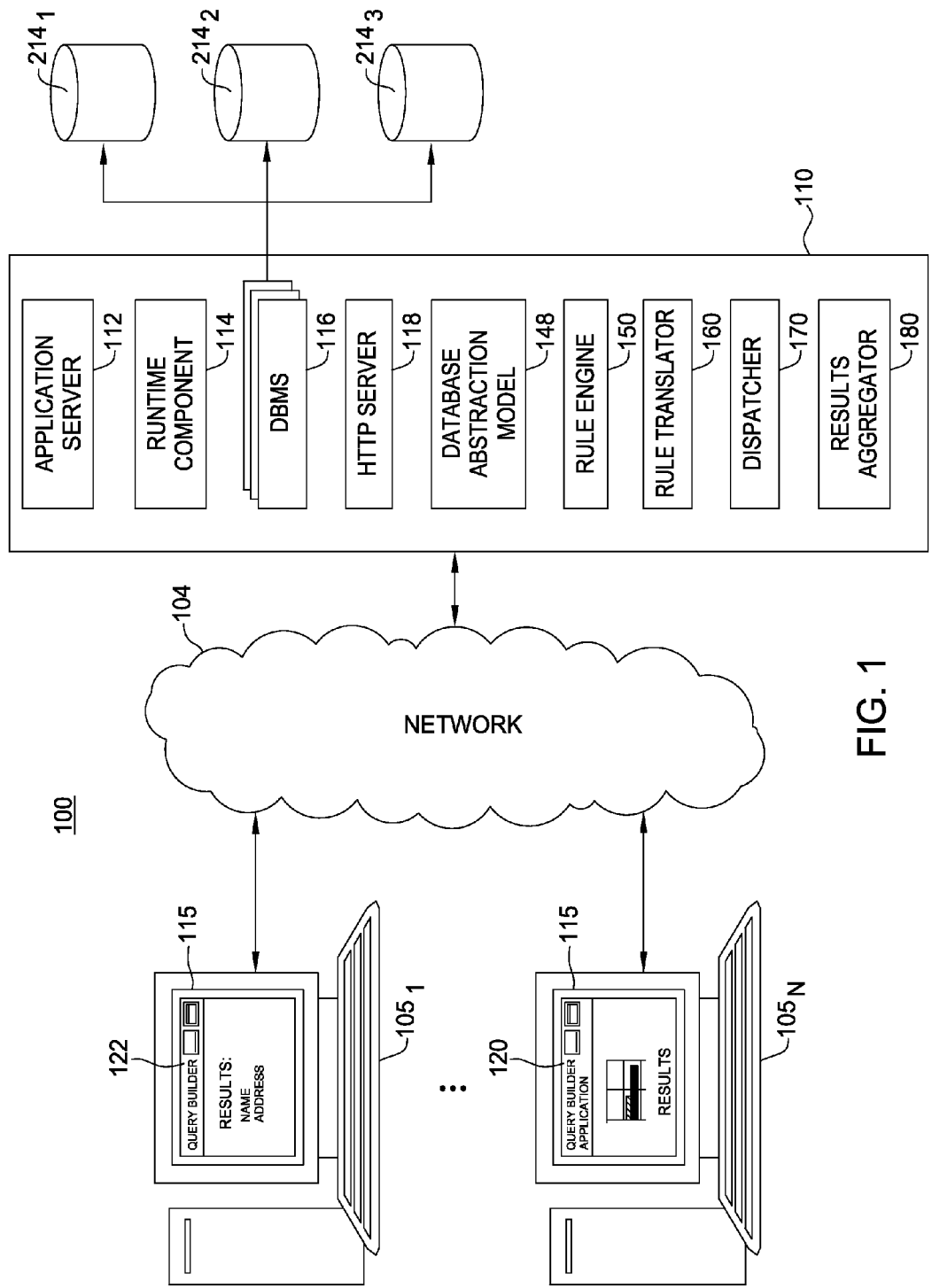
FIG. 1 illustrates a network environment using a client-server configuration, according to one embodiment of the invention.

Generally, a database abstraction model is constructed from logical fields that map to data stored in the underlying physical database. Each logical field defines an access method that specifies a location (e.g., a table and column) in the underlying database from which to retrieve data for a given logical field. Users compose an abstract query by selecting logical fields and specifying conditions. Data is retrieved from the physical database by generating a resolved query (e.g., an SQL statement) from the abstract query. Because the database abstraction model is not tied to the syntax or semantics of the physical database or query language, additional capabilities may be provided by the database abstraction model without having to modify the underlying database.

Inference rules may be used to evaluate data in a database. A set of rules may implement an analysis routine used to detect (or infer) states or conditions about data, and a rule engine can evaluate predicates and execute actions defined in the rules. Where actions of rules are defined to provide recommendations for users, for example, treatment recommendations for doctors in medical institutions, the rules may be defined such that corresponding predicates reflect expert-based knowledge of possible diagnoses and evaluations of patient conditions. Thus, in such a case, rules may be implemented to assist doctors by making diagnosis recommendations, drug recommendations, providing reminders of required verifications and checks, etc.

However, composing inference rules is frequently a complex and difficult process which requires detailed knowledge of a given database as well as the requisite expert knowledge for rule semantics. More specifically, for each predicate, and for each action of the given rule that the user wants to create, the user may require an understanding of the database schema in order to identify the correct tables and columns, and relationships between tables and columns in the underlying database table(s). One technique for managing the creation of rules is to use abstract rule sets. Abstract rules specify predicates and actions composed using logical fields of a database abstraction model. Because the logical fields provide a user with a logical view of data, the user may compose rules based on their conceptual understating of the data, without the need to also understand the physical layout of the underlying database or query language grammar.

Analysis routines can be defined by abstract rule sets including one or more abstract rules, each having one or more predicates and actions. Commonly, abstract rules may be composed using the structure:

IF [predicate] THEN [perform specified action]

A rule predicate specifies a conditional statement evaluated in a rule engine. As stated, the predicate may be composed from the logical fields of a data abstraction model. Further, prior to being evaluated by the rule engine, the predicate may be transformed into a form executable by the rule engine. For example, the rule engine may transform the predicate into an SQL query used to identify database records that satisfy the condition specified in the predicate, e.g., a set of patient identifiers. For database records that satisfy the predicate (i.e., meet the condition), then rule engine may execute the rule action specified by the rule.

Embodiments of the invention provide techniques for optimizing the processing of abstract rules. In general, the results of executing an abstract query may be used as data inputs for processing an abstract rule. In one embodiment, query results may be sorted according to input field values required for processing an abstract rule. If a record of the sorted query results includes the same input values as a preceding record, then the rule output of the preceding record may be reused, rather than processing the abstract rule again. In other words, once an abstract rule is used to evaluate a given set of input data (i.e., a record included in a query result data), if a subsequent row includes similar (or identical values) then the results of processing the rule on the first set of input data may be reused as the result of the subsequent row. The results remain correct as the query results are deterministic. That is, given the same input (predicates) to the rule the actions recommended (or not) will be the same. Accordingly, the use of a rule engine may be reduced, resulting in improved performance and reduced costs. In one aspect of the invention, abstract rule sets may be grouped in rule set containers. A rule set container may also include an abstract query to provide input data records to be processed with the included abstract rule sets. Further, the rule set container may include dispatching rules for use in optimizing the processing of the abstract rule sets by a rule engine.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using an application server 112 interacting with HTTP server 118 to service HTTP requests. In another embodiment, client application 120 may comprise a database front-end, or query application program running on client system $105_N$. The web-browser 122 and application 120 may be configured to allow a user to compose an abstract query, and to submit the query to the runtime component 114 for processing. In yet another embodiment, client application 120 may be configured to enable a user to specify an abstract query to be run in a scheduled process. Such a scheduled process may be used, for example, to perform a daily analysis of database records.

As illustrated in FIG. 1, server system 110 may further include a runtime component 114, a database management system (DBMS) 116, a database abstraction model (DAM) 148, a rule engine 150, a rule translator 160, a dispatcher 170, and a results aggregator 180. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

In one embodiment, the rule engine 150 represents one or more rule engines (i.e., inference engines) configured to carry out analysis routines for various purposes, including know-how management, decision making and statistical analysis. More specifically, the rule engine 150 may perform analysis routines by processing rule sets which include one or more rules. As stated, each rule may include a set of predicates and actions. In one embodiment, rule engine 150 may be a software application executed on one or more processor units included on server 110. In another embodiment, rule engine 150 may be a software application executed on multiple processing nodes of a distributed processing network, i.e., a large parallel computing grid or cluster. Each processing node may include a processor, a memory, and network connections to other processing nodes. In yet another embodiment, rule engine 150 may be provided as "software as a service" (SAAS), wherein functions on a remote hosted system are accessed over a network as required. Rule engine 150 may be licensed on a "per use" basis, meaning each use of a function included in rule engine 150 is charged as a separate cost (e.g., a charge for each query result processed). Further, rule engine 150 may be licensed so that costs are based on the number of users or number of processors accessing (or authorized to access) the rule engine 150.

In one embodiment, the DAM 148 may include abstract rule sets. As described, abstract rules are composed by referencing logical fields of DAM 148, and thus do not require a user to understand the schema of the physical database 214. Rule translator 160 represents a software application configured to translate abstract rules to executable rules, formatted as required by the rule engine 150. The executable rules may also be resolved to a query executable by DBMS 116 against database 214. Dispatcher 170 represents a software application configured to dispatch rules and associated data for processing in the rule engine 150. Results aggregator 180 represents a software application configured to aggregate the output of rule engine 150 for presentation to a user. The function of the components of server system 110 is further described below with reference to FIGS. 2 and 3.

Figure 2:
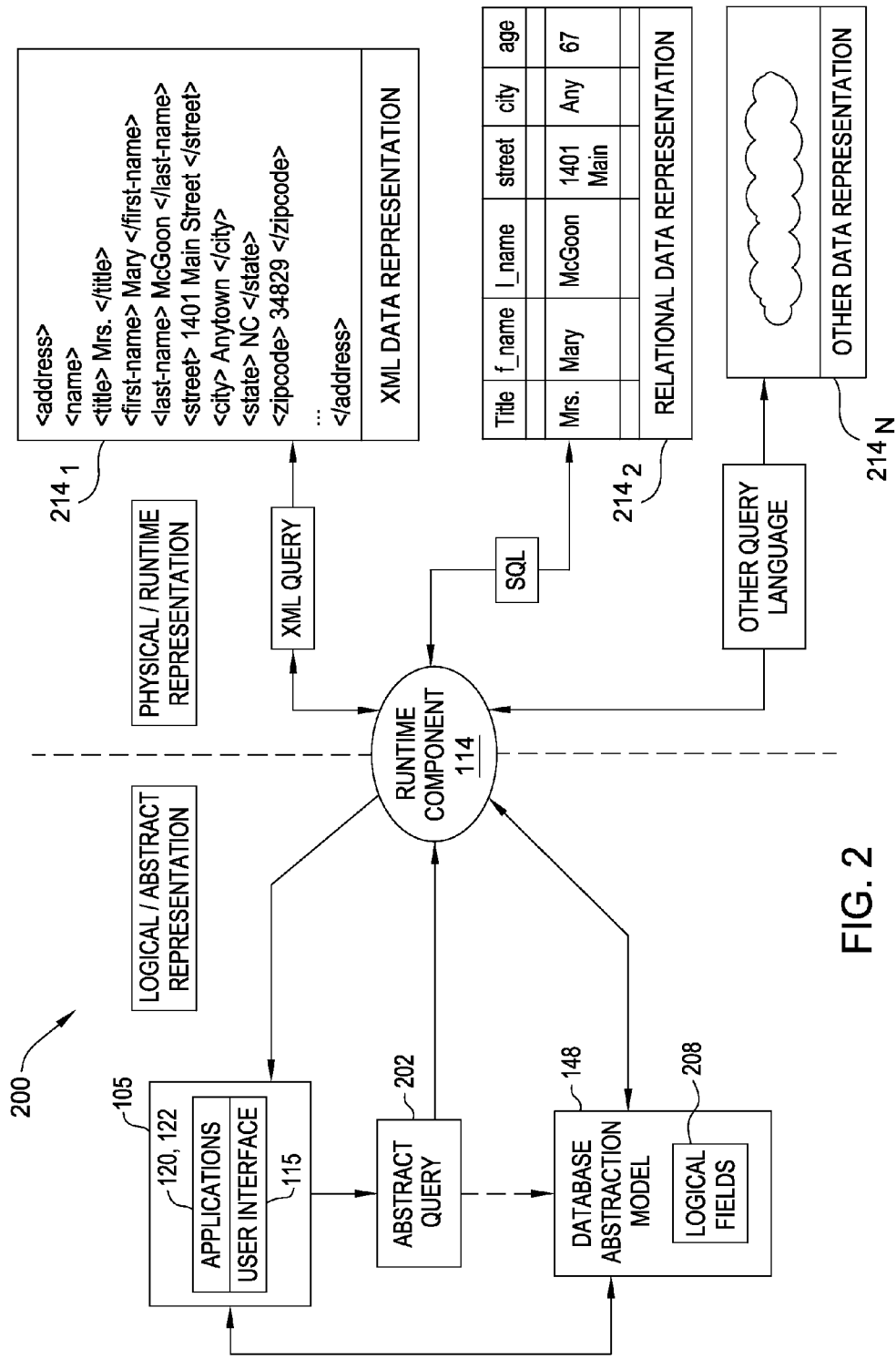
FIG. 2 is a diagram illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users may compose an abstract query 202 using the user interface 115 provided by applications 120, 122. An abstract query 202 is generally referred to as "abstract" because it is composed using logical fields 208 rather than direct references to data structures in the underlying physical databases 214. The logical fields 208 include specifications of access methods for mapping to a physical view of the data, including various underlying storage mechanisms. For example, for a given logical field 208, the runtime component may generate an XML query that queries data from an XML database $214_1$, an SQL query of relational database $214_2$, or other query composed according to another physical storage mechanism using "other" data representation $214_3$, or combinations thereof (whether currently known or later developed).

In one embodiment, the results of the abstract query 202 may be used as inputs for executing an abstract rule. That is, a rule engine (e.g., rule engine 150 illustrated in FIG. 1) may be configured to process abstract rules by using the results of an abstract query 202 as rule inputs. For example, consider a DAM configured for data records of a hospital. An abstract query performed in the hospital DAM may retrieve patient data records for use as inputs to abstract rule sets. For example, assume that an abstract rule set is configured to identify patients receiving improper or insufficient treatment (e.g., a patient receives medication that is incompatible with some known risk-factor or other medication being taken by the patient). Thus, in this example, processing the abstract rule sets with patient data is performed as an analysis routine to alert medical personnel of potentially dangerous or critical situations. Such analysis routines may be scheduled to be run periodically (e.g., daily, weekly, etc.), in order to analyze new or updated data.

Figure 3:
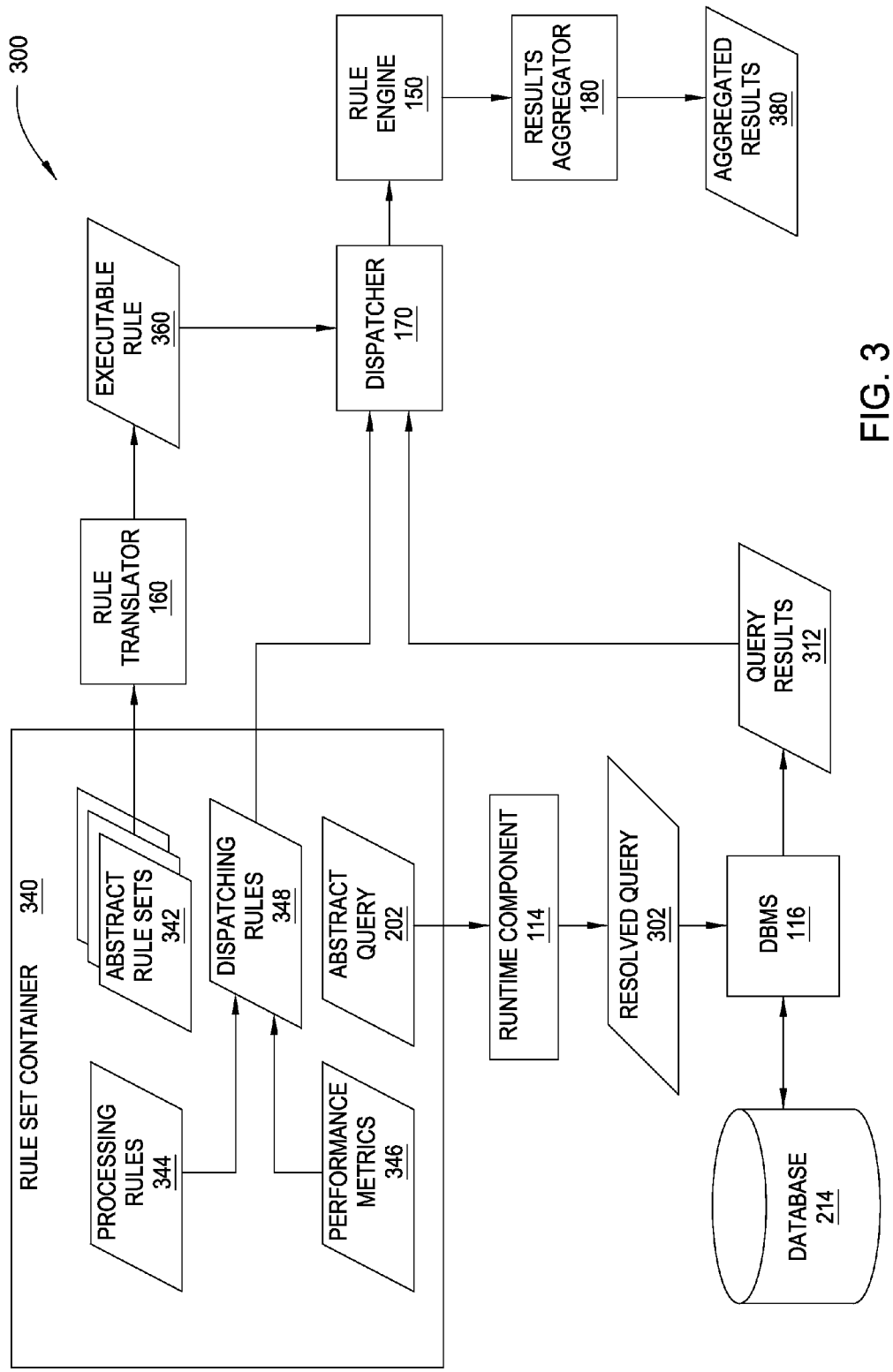
FIG. 3 illustrates a relational view of software components for optimizing the processing of abstract rule sets, according to one embodiment of the invention.

FIG. 3 illustrates a relational view of software components 300 for optimizing the processing of abstract rule sets, according to one embodiment of the invention. As shown, software components 300 include a rule set container 340, runtime component 114, database management system (DBMS) 116, database 214, rule engine 150, rule translator 160, dispatcher 170, and results aggregator 180.

In one embodiment, rule set container 340 is a data structure configured to enable the processing of multiple abstract rule sets 342 in combination. More specifically, rule container 340 may enable multiple abstract rule sets 342 to be processed with a single set of data inputs, as if processing a single abstract rule set 342. For example, the results of one rule may be used as input to another, or the action specified for query data satisfying the predicates one rule may be to process the same query result data using a subsequent rule. As another alternative, the abstract rules sets may contain multiple rules, each used to process query result data independently from one another. Illustratively, rule set container 340 contains multiple abstract rule sets 342. In another embodiment, rule set container 340 may include pointers to external abstract rule sets 342. A method for composing a rule set container 340 is discussed below with reference to FIG. 4. Rule set container 340 also includes processing rules 344, performance metrics 346, dispatching rules 348, and an abstract query 202. As described, abstract query 202 is composed by using logical fields 208 of DAM 148 to specify query conditions and results fields. Similarly, abstract rule sets 342 are composed by using logical fields 208 to specify a rule predicates and a corresponding rule action.

As shown, abstract query 202 may be translated by runtime component 114 into a resolved query 302. Resolved query 302 is submitted to DBMS 116 for execution against database 214, thus producing query results 312. The query results 312 include field values which can be used as inputs to an abstract rule set 342. However, it should be noted that the present invention is not limited to the use of field values obtained from query results as inputs to abstract rule set 342. Instead, any suitable inputs to abstract rule set 342 are broadly contemplated including, for instance, a user inputting data via user interface 115.

In one embodiment, an abstract rule set 342 is translated into executable rule 360 by rule translator 160. As a result of the translation, executable rule 360 is formatted in the data format required by rule engine 150. One example of such a data format is the Arden syntax, which is used in rule engines for medical knowledge. Further, the predicates included in executable rule 360 (and abstract query 202) may be resolved to query fragments executable by DBMS 116 (e.g., an SQL query fragment). That is, instead of the logical fields referenced by the abstract rule set 342, the executable rule 360 references data structures in the underlying physical database 214.

In one embodiment, processing rules 344 may be composed by a user to specify how the abstract rule sets 342 should be processed. In particular, processing rules 344 may be used to optimize the use of rule engine 150. For example, processing rules 344 may specify the amount of concurrent processes allowed in rule engine 150 (i.e., the number of concurrent submissions to the rule engine 150). In another example, processing rules 344 may specify the amount of memory or hard drive storage which may be allocated for processing rules. In yet another example, processing rules 344 may specify the priorities used in processing the various abstract rule sets 342. Performance metrics 346 may describe characteristics of processing a particular abstract rule set 342, and may be collected during executions of that rule set. Such characteristics may include the processing time required to execute the rule set, the suitability of the rule set to parallel processing, the licensing cost for any required rule engine functions, and the like.

In one embodiment, dispatcher 170 is a software application configured to dispatch the query results 312 and executable rule 360 to be processed in the rule engine 150. Dispatcher 170 may function according to dispatching rules 348, which may specify the efficient use of rule engine 150. More specifically, dispatcher 170 may follow dispatching rules 348 to sort query results 312, to split query results 312 into data blocks (i.e., groupings of result records), to dispatch the data blocks to rule engine 150, and the like. As shown, dispatching rules 348 may be generated from processing rules 344 and performance metrics 346.

In one embodiment, dispatcher 170 may be configured to determine whether executable rule 360 is deterministic, meaning that every time the rule is executed with a given set of input values, the same result is output. Thus, assuming executable rule 360 is a deterministic rule, processing a set of records, each including the same input values, will result in the same rule output for each record. Generally, deterministic rules are characterized by being solely based on input values. Thus, deterministic rules will typically not include rule functions such as date/time dependent functions, probability functions, statistics functions, random number generators, and the like. In one embodiment, when an executable rule is deterministic, it is executed only once for any particular set of input data included in query results, even though that set of input data may occur multiple times in the query results.

In one embodiment, dispatcher 170 may be further configured to sort (i.e., reorder) query results 312 according to input fields required by a deterministic rule. For example, Table I illustrates a set of query results 312 that have been sorted according to input fields.

TABLE I

SORTED QUERY RESULTS EXAMPLE

| 001 | PATIENT ID | HEMOGLOBIN | GENE 3D42 | DRUG |
|---|---|---|---|---|
| 002 | 1005 | LOW | YES | ABCNOL |
| 003 | 1006 | LOW | YES | ABCNOL |
| 004 | 1003 | LOW | YES | XYZNOL |
| 005 | 1001 | LOW | YES | XYZNOL |
| 006 | 1004 | NORMAL | YES | ABCNOL |
| 007 | 1002 | NORMAL | NO | XYZNOL |

As shown, Table I includes the query results for six medical patients, identified by the PATIENT_ID values of 1001 through 1006. In this example, assume that the query results are to be processed as inputs to an abstract rule set 342 in the order in which they appear in Table I. Accordingly, the query results have been sorted according to the values of fields HEMOGLOBIN, GENE_3D42, and DRUG, which are the input fields for a deterministic rule.

Referring again to FIG. 3, dispatcher 170 may be further configured to split the sorted query results into data blocks, according to one embodiment. Dispatching rules 348 may specify how dispatcher 170 generates such data blocks, such that inputs received by the rule engine 150 are efficiently processed. For example, dispatching rules 348 may specify a preferred size of the data blocks, a number of data blocks that may be dispatched concurrently, and the like. In one embodiment, dispatcher 170 may split the sorted query results into data blocks, such that records having the same input values are included in a single block. However, if the number of records with the same input values is larger than the maximum data block size, or if otherwise precluded by dispatching rules 348, then all records with the same input field values may not be included in a single data block.

As shown, rule engine 150 receives executable rule 360 and the sorted query results from dispatcher 170. Generally, rule engine 150 evaluates the executable rule 360 using each row of the sorted query results. In one embodiment, rule engine 150 may be configured to determine whether a record being evaluated includes the same input field values as a preceding record and, if not, to execute the executable rule 360 using the input field values of the present record. However, if the record has the same input field values are the same preceding record, and if executable rule 360 is deterministic, rule engine 150 may be further configured to reuse the output of the previous record. That is, an output from an initial execution of a deterministic rule may be reused as an output of a subsequent record having the same input values, without requiring another execution of the rule. Thus, by avoiding repeated rule executions using the same input field values, the system load on rule engine 150 may be reduced. That is, fewer system resources will be consumed, including CPU processing time, memory allocation, storage requirements, network bandwidth, and the like. Further, any licensing costs associated to the use of rule engine (e.g., "per use" costs, user costs, processor costs, etc.) may be reduced as well.

In one embodiment, results aggregator 180 may be configured to aggregate the outputs of rule engine 150 to produce the aggregated results 380. The outputs of the rule engine 150 correspond to the evaluations of executable rule 360 using the records included in query results 312. Further, results aggregator 180 may be configured to aggregate the outputs resulting from processing the multiple data blocks generated by dispatcher 170. Furthermore, results aggregator 180 may be configured to aggregate the outputs resulting from processing the data blocks in different processing sites (i.e., multiple CPUs included in server system 110, independent nodes of a distributed processing network, etc.). The aggregated results 380 may be used for completing analysis routines, such as diagnosis recommendations, drug recommendations, and the like.

Of course, the above example is provided for illustrative purposes only, and is not intended to limit the scope of the invention. It should also be noted that the components of the relational view 300 are illustratively shown as separate software components. However, embodiments are contemplated in which functionality of any component may be incorporated in another component.

Figure 4:
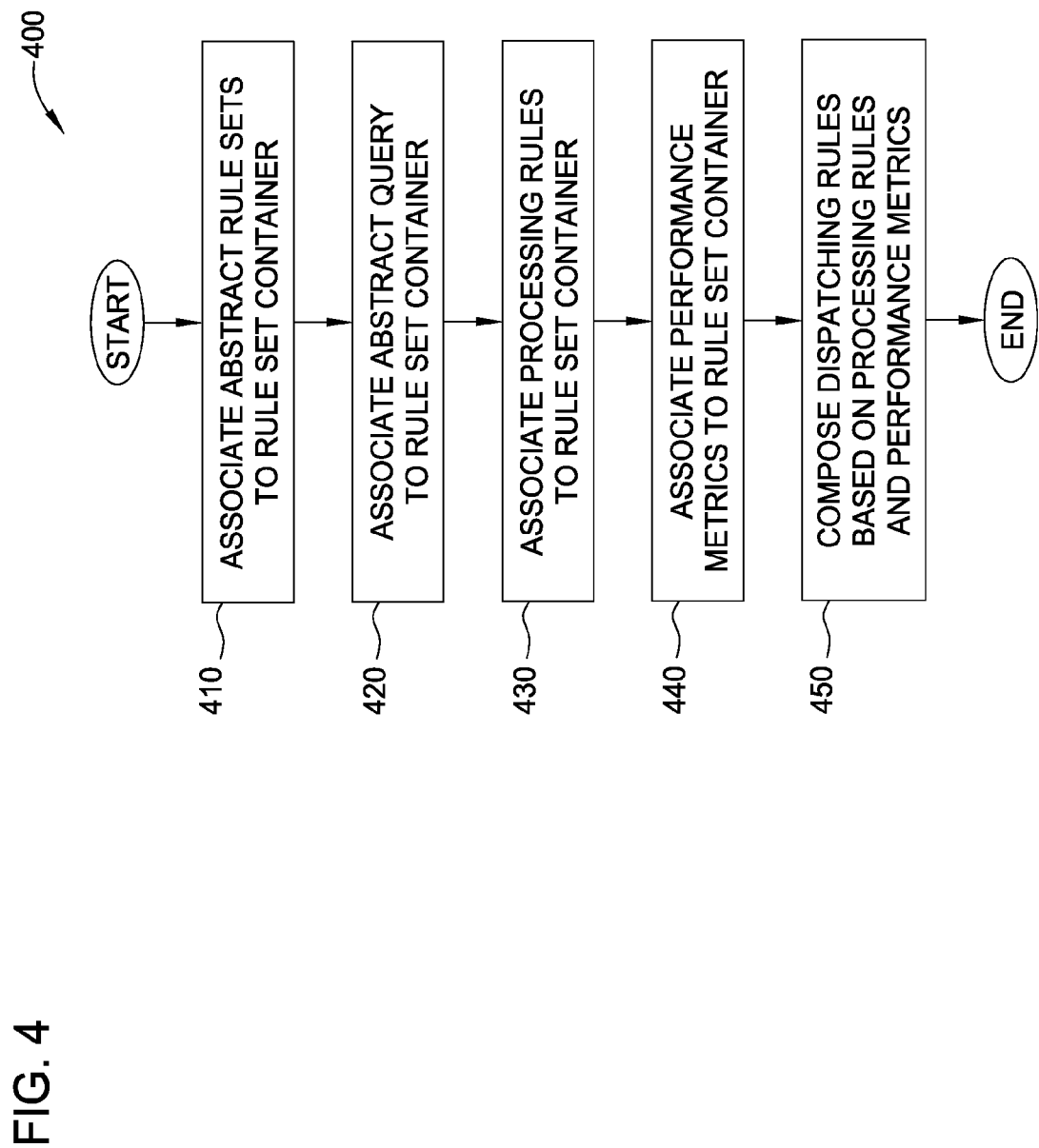
FIG. 4 is a flow diagram illustrating a method for composing a rule set container, according to one embodiment of the invention.

FIG. 4 is a flow diagram illustrating a method 400 for composing a rule set container, according to one embodiment of the invention. Persons skilled in the art will understand that, even though the method is described in conjunction with the systems of FIGS. 1-3, any system configured to perform the steps of method 400, in any order, is within the scope of the present invention.

The method 400 begins at step 410 by associating one or more abstract rule sets with a rule set container. For example, abstract rule sets 342 may be associated to rule set container 340, as illustrated in FIG. 3. At step 420, an abstract query is associated to the rule set container. For example, abstract query 202 may be associated to rule set container 340, as illustrated in FIG. 3. As described, the abstract query may retrieve the data records to be used as inputs to abstract rule sets included in the rule set container.

At step 430, processing rules may be associated with the rule set container, and may specify how the abstract rule sets included in 342 should be processed. For example, processing rules 344 may be associated to rule set container 340. At step 440, performance metrics may be associated to the rule set container. For example, performance metrics 346 may be associated to the rule set container 340. At step 450, dispatching rules may be composed based on the processing rules and performance metrics. For example, as illustrated in FIG. 3, dispatching rules 348 may be based on processing rules 344 and performance metrics 346. As described, the dispatching rules may be used by a dispatcher, so as to ensure efficient use of a rule engine. After step 450, the method 400 terminates. In one embodiment, the processing rules, performance metrics, and dispatching rules described in method 400 may be associated to the rule set container as metadata (e.g., as XML metadata included in the rule set container 340).

Figure 5:
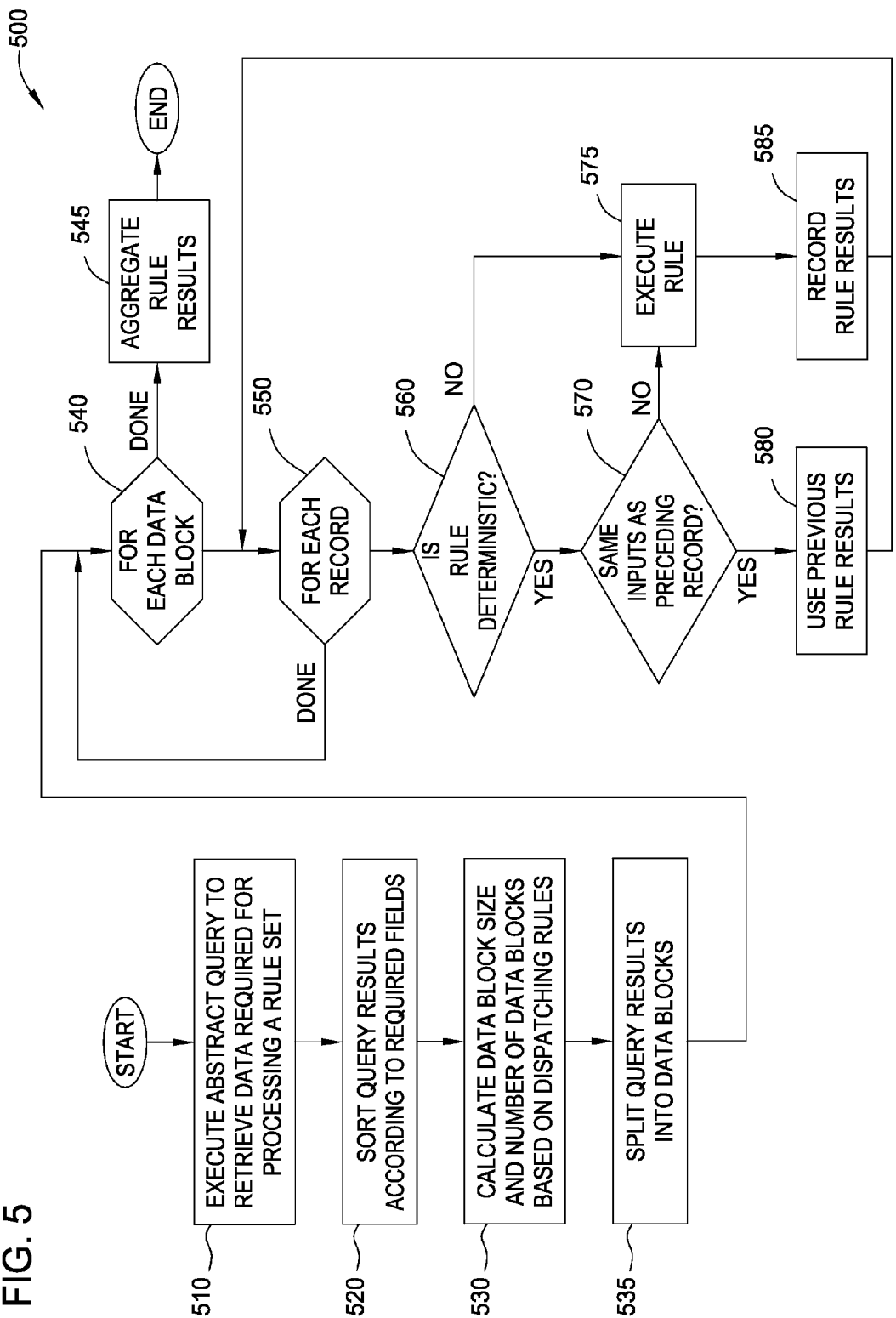
FIG. 5 is a flow diagram illustrating a method for processing abstract rules with query results, according to one embodiment of the invention.

FIG. 5 is a flow diagram illustrating a method 500 for processing abstract rules with query results, according to one embodiment of the invention. Persons skilled in the art will understand that, even though the method is described in conjunction with the systems of FIGS. 1-3, any system configured to perform the steps of method 500, in any order, is within the scope of the present invention.

The method 500 begins at step 510, by executing an abstract query to retrieve data required for processing an abstract rule. For example, referring to the example shown in FIG. 3, abstract query 202 may be translated by runtime component 114 into a resolved query 302. Resolved query 302 is submitted to DBMS 116 for execution against database 214, thus producing query results 312. The query results may represent, for example, data records of medical patients. At step 520, the query results may be sorted according to input fields required for processing the abstract rule. That is, the query results are ordered so that records having the same input field values are consecutive. For example, the query results 312 may be sorted as shown in Table I.

At step 530, dispatching rules (composed using the method 400 discussed above) may be used to calculate a data block size and a number of data blocks to use in dispatching the query results to the rule engine. That is, data blocks may be defined to enable the efficient use of a rule engine. For example, dispatcher 170 may split query results 312 into data blocks suitable for processing in rule engine 150. At step 535, the query results may be split into data blocks, according to the data block size and a number of data blocks calculated at step 530.

At step 540, the method 500 enters a loop (defined by steps 550-585) for processing each data block as an input to the abstract rule. At step 550, the method 500 enters a loop (defined by steps 560-585) for processing each query result record included in the present data block (each block may be processed concurrently). For example, assuming the abstract query retrieves medical data of a hospital, each record may represent data describing a specific patient, such as test results, symptoms, prescriptions, etc.

At step 560, it is determined whether the abstract rule is deterministic, meaning that executing the rule with a given set of input values will always result in the same rule output. If the abstract rule is deterministic, then at step 570, it is determined whether the input values contained in the present record are the same as the values contained in the preceding record (if the present record is the first record, assume step 570 resolves to "NO"). If the input values are the same, then at step 580, the previous rule results are used as rule results for the present record, thus avoiding executing the rule engine. However, if at step 560 it is determined that the abstract rule is not deterministic, or if at step 570 it is determined that the present record has different input values that the preceding record, then at step 575, the abstract rule may be executed using the input values of the present record. For example, the abstract rule may be translated to an executable rule 360 by rule translator 160, and may be executed by rule engine 150 using the input values of the present record, as shown in FIG. 3. Following step 575, at step 585, the rule results may be stored for potential use with any following records. Once all records are completed at step 550, the method 500 continues at step 540, by processing a new data block. Once all data blocks are completed at step 540, then at step 545, all rule results (from steps 580 and 585) are combined into aggregated rule results. After step 545, the method 500 terminates.

Advantageously, embodiments of the invention provide techniques for optimizing the processing of abstract rule sets. Currently, a rule engine may be executed to process an abstract rule with every record of query results. In the case of a deterministic abstract rule, query result records may be ordered such that rule results may be reused for records having the same rule input values. Accordingly, by reducing the use of the rule engine, the processing load and cost incurred by the rule engine may be reduced.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing an abstract rule, comprising:

receiving an abstract rule having (i) a conditional statement and (ii) a consequential statement defining a particular result returned by the abstract rule for a given set of input data supplied to the rule;
   receiving a set of query results comprising a plurality of data records each including one or more input values, wherein the set of query results were produced by executing a query;
   sorting the plurality of data records from the set of query results according to the one or more input values;
   splitting the sorted plurality of data records from the set of query results into two or more data blocks;
   for each record of a given data block from the two or more data blocks, determining whether the input values of a first record of the given data block match the input values of a previously processed record;
      if so, setting, as an output of processing the first record, the result returned for processing the previously processed record against the abstract rule, and
      otherwise, processing the input values of the first record against the abstract rule to produce a result.

2. The method of claim 1, wherein the conditional statement is composed from one or more logical fields, and wherein the logical fields are defined in a data abstraction model modeling an underlying physical database.

3. The method of claim 1, wherein determining whether the input values of the first record match the input values of a previously processed record comprises determining whether the input values of the first record are within a specified range of the input values of a previously processed record.

4. The method of claim 1, wherein determining whether the input values of the first record match the input values of a previously processed record comprises determining whether the input values of the first record are identical to the input values of a previously processed record.

5. The method of claim 1, wherein the abstract rule is included in a rule set container, wherein the rule set container comprises one or more abstract rule sets, and wherein executing the rule set container comprises executing each of the one or more abstract rule sets with a set of input values.

6. The method of claim 5, wherein the rule set container further comprises at least one of an abstract query and one or more dispatching rules, wherein the abstract query retrieves a set of query results for use as an input to the one or more abstract rule sets, and wherein the one or more dispatching rules specify the splitting of the sorted plurality of data records into two or more data blocks.

7. The method of claim 6, further comprising, prior to splitting the sorted plurality of records into two or more data blocks:

calculating, based on the dispatching rules, a maximum data block size.

8. The method of claim 6, wherein the one or more dispatching rules further specify the dispatching of each data block to different sites of a plurality of processing sites.

9. A computer readable storage medium containing a program which, when executed, performs an operation for processing an abstract rule, comprising:

receiving an abstract rule having (i) a conditional statement and (ii) a consequential statement defining a particular result returned by the abstract rule for a given set of input data supplied to the rule;
   receiving a set of query results comprising a plurality of data records each including one or more input values, wherein the set of query results were produced by executing a query;

sorting the plurality of data records from the set of query results according to the one or more input values;

splitting the sorted plurality of data records from the set of query results into two or more data blocks;

for each record of a given data block from the two or more data blocks, determining whether the input values of a first record of the given data block match the input values of a previously processed record;

if so, setting, as an output of processing the first record, the result returned for processing the previously processed record against the abstract rule, and otherwise, processing the input values of the first record against the abstract rule to produce a result.

10. The computer readable storage medium of claim 9, wherein the conditional statement is composed from one or more logical fields, and wherein the logical fields are defined in a data abstraction model modeling an underlying physical database.

11. The computer readable storage medium of claim 9, wherein determining whether the input values of the first record match the input values of a previously processed record comprises determining whether the input values of the first record are within a specified range of the input values of a previously processed record.

12. The computer readable storage medium of claim 9, wherein determining whether the input values of the first record match the input values of a previously processed record comprises determining whether the input values of the first record are identical to the input values of a previously processed record.

13. The computer readable storage medium of claim 9, wherein the abstract rule is included in a rule set container, wherein the rule set container comprises one or more abstract rule sets, and wherein executing the rule set container comprises executing each of the one or more abstract rule sets with a set of input values.

14. The computer readable storage medium of claim 13, wherein the rule set container further comprises at least one of an abstract query and one or more dispatching rules, wherein the abstract query retrieves a set of query results for use as an input to the one or more abstract rule sets, and wherein the one or more dispatching rules specify the splitting of the sorted plurality of data records into two or more data blocks.

15. The computer readable storage medium of claim 14, further comprising, prior to splitting the sorted plurality of records into two or more data blocks:

calculating, based on the dispatching rules, a maximum data block size.

16. The computer readable storage medium of claim 14, wherein the one or more dispatching rules further specify the dispatching of each data block to different sites of a plurality of processing sites.

17. A system, comprising:

one or more processing nodes; and a memory containing a program, which when executed on the one or more processing nodes, is configured to process an abstract rule by performing the steps of:

receiving an abstract rule having (i) a conditional statement and (ii) a consequential statement defining a particular result returned by the abstract rule for a given set of input data supplied to the rule;

receiving a set of query results comprising a plurality of data records each including one or more input values, wherein the set of query results were produced by executing a query;

sorting the plurality of data records from the set of query results according to the one or more input values;

splitting the sorted plurality of data records from the set of query results into two or more data blocks;

for each record of a given data block from the two or more data blocks, determining whether the input values of a first record of the given data block match the input values of a previously processed record;

if so, setting, as an output of processing the first record, the result returned for processing the previously processed record against the abstract rule, and otherwise, processing the input values of the first record against the abstract rule to produce a result.

18. The system of claim 17, wherein the conditional statement is composed from one or more logical fields, and wherein the logical fields are defined in a data abstraction model modeling an underlying physical database.

19. The system of claim 17, wherein determining whether the input values of the first record match the input values of a previously processed record comprises determining whether the input values of the first record are within a specified range of the input values of a previously processed record.

20. The system of claim 17, wherein determining whether the input values of the first record match the input values of a previously processed record comprises determining whether the input values of the first record are identical to the input values of a previously processed record.

21. The system of claim 17, wherein the abstract rule is included in a rule set container, wherein the rule set container comprises one or more abstract rule sets, and wherein executing the rule set container comprises executing each of the one or more abstract rule sets with a set of input values.

22. The system of claim 21, wherein the rule set container further comprises at least one of an abstract query and one or more dispatching rules, wherein the abstract query retrieves a set of query results for use as an input to the one or more abstract rule sets, and wherein the one or more dispatching rules specify the splitting of the sorted plurality of data records into two or more data blocks.

23. The system of claim 22, further comprising, prior to splitting the sorted plurality of records into two or more data blocks:

calculating, based on the dispatching rules, a maximum data block size.

24. The system of claim 22, wherein the one or more dispatching rules further specify the dispatching of each data block to different nodes of the one or more processing nodes.

\* \* \* \* \*